(12) United States Patent
Carletti

(10) Patent No.: US 8,988,039 B2
(45) Date of Patent: Mar. 24, 2015

(54) POWER CONVERTER CIRCUIT

(75) Inventor: Andrea Carletti, Munich (DE)

(73) Assignee: Infineon Technologies AG, Neubiberg (DE)

( * ) Notice: Subject to any disclaimer, the term of this patent is extended or adjusted under 35 U.S.C. 154(b) by 323 days.

(21) Appl. No.: 13/472,215

(22) Filed: May 15, 2012

(65) Prior Publication Data

US 2013/0307467 A1 Nov. 21, 2013

(51) Int. Cl.
*H02J 7/00* (2006.01)

(52) U.S. Cl.
CPC ........................................ *H02J 7/00* (2013.01)
USPC .......................................................... 320/107

(58) Field of Classification Search
None
See application file for complete search history.

(56) References Cited

U.S. PATENT DOCUMENTS

| 7,889,524 | B2 * | 2/2011 | Lee et al. .......................... 363/65 |
| 2010/0123428 | A1 * | 5/2010 | Wu et al. ........................ 320/102 |

OTHER PUBLICATIONS

Bocock, G., "Power Supply Technical Guide," XP Power PLC 2007, Issue 2, 152 pages.
Oh, C-Y., et al., "A High-Efficient Nonisolated Single-Stage On-Board Battery Charger for Electric Vehicles," IEEE Transactions on Power Electronics, Dec. 2013, vol. 28, No. 12, pp. 5746-5758.
Khan, I., "Battery Chargers for Electric and Hybrid Vehicles," Power Electronics in Transportation, Oct. 1994, pp. 103-112.
Kuperman, A., et al., "Battery Charger for Electric Vehicle Traction Battery Switch Station," IEEE Transactions on Industrial Electronics, vol. 60, No. 12, Dec. 2013, pp. 5391-5400.
Youn, S-Y., et al., "Electrolytic-capacitor-less AC/DC electric vehicle on-board battery charger for universal line applications," Electronic Letters, Jun. 2011, vol. 47, No. 13, 2 pages.
Andreycak, Bill, "Optimizing Performance in UC3854 Power Factor Correction Applications," Unitrode Design Note, DN-39E, 1999, 6 pages.
Andreycak, Bill, "Power Factor Correction using the UC3852 Controlled On-Time Zero Current Switching Technique," U-132, Unitrode Corpration, 1999, 17 pages.
Cohen, Isaac, et al., "High Power Factor and High Efficiency—You Can Have Both," Texas Instruments Incorporated, 2008, 13 pages.
Noon, James P., "Designing High-Power factor Off-Line Power Supplies," Texas Instruments Incorporated, 2003, 36 pages.
Todd, Phillip C., "Boost Power Factor Corrector Design with the UC3853," Unitrode Corporation, U-159,1999, 24 pages.
Todd, Phillip C., "UC3854 Controlled Power Factor Correction Circuit Design," Unitrode Application Note, U-134, 1999, 21 pages.

* cited by examiner

*Primary Examiner* — Leigh Garbowski
(74) *Attorney, Agent, or Firm* — Slater & Matsil, L.L.P.

(57) ABSTRACT

A power converter circuit includes input terminals configured to receive an input voltage and an input current and output terminals configured to provide an output voltage and an output current. A boost converter stage is coupled between the input terminals and the output terminals. The power converter circuit is operable to operate in one of a first operation mode, a second operation mode, and a third operation mode dependent on the output voltage. The first, second and third operation modes are mutually different. In each of the first, second and third operation modes, the input current is controlled dependent on the input voltage.

35 Claims, 5 Drawing Sheets

POWER CONVERTER CIRCUIT

TECHNICAL FIELD

Embodiments of the present invention relate to a power converter circuit, in particular a power converter circuit for charging a battery.

BACKGROUND

Rechargeable batteries are widely used in mobile applications, such as portable electronic devices or electric vehicles. In particular, with an increasing importance of vehicles that are electrically driven, it is becoming more and more important to efficiently recharge the batteries of those vehicles.

SUMMARY OF THE INVENTION

A first embodiment relates to a power converter circuit including input terminals for receiving an input voltage and an input current, output terminals for providing an output voltage and an output current, and a boost converter stage coupled between the input terminals and the output terminals. The power converter circuit is operable to operate in one of a first operation mode, a second operation, and a third operation mode dependent on the output voltage. The first, second and third operation modes are mutually different, and in each of the first, second and third operation modes the input current is controlled dependent on the input voltage.

A second embodiment relates to a method for operating a power converter circuit including input terminals for receiving an input voltage and an input current, output terminals for providing an output voltage and an output current, and a boost converter stage coupled between the input terminals and the output terminals. The method includes operating the power converter circuit in one of a first operation mode, a second operation, and a third operation mode dependent on the output voltage. The first, second and third operation modes are mutually different, and in each of the first, second and third operation modes the input current is controlled dependent on the input voltage.

A third embodiment relates to an electronic circuit. The electronic circuit includes a power converter circuit with input terminals for receiving an input voltage and an input current, output terminals for providing an output voltage and an output current, and a boost converter stage coupled between the input terminals and the output terminals. The electronic circuit further includes a rechargeable battery coupled to the output terminals of the power converter circuit. The power converter circuit is operable to operate in one of a first operation mode, a second operation, and a third operation mode dependent on the output voltage. The first, second and third operation modes are mutually different, and in each of the first, second and third operation modes the input current is controlled dependent on the input voltage.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

FIG. 2, which includes

DETAILED DESCRIPTION OF ILLUSTRATIVE EMBODIMENTS

In the following detailed description, reference is made to the accompanying drawings, which form a part thereof, and in which is shown by way of illustration specific embodiments in which the invention may be practiced.

Embodiments of the invention relate to a power converter circuit, in particular a power converter circuit for charging a battery. Conventional power converter circuits for charging a battery (battery chargers) include two stages, namely a first stage that generates a DC voltage from an AC grid voltage, and a second stage that generates from the DC voltage a defined charging current for a battery. Each of these two stages may include a switching converter, with each switching converter including at least one semiconductor switch that is cyclically switched on and off at frequencies of several kilohertz (kHz), or more, in order to control the DC voltage in the first stage and the output current in the second stage. Driving semiconductor switches at high switching frequencies, however, causes switching losses, wherein these losses normally increase when the switching frequency increases.

Figure 1:
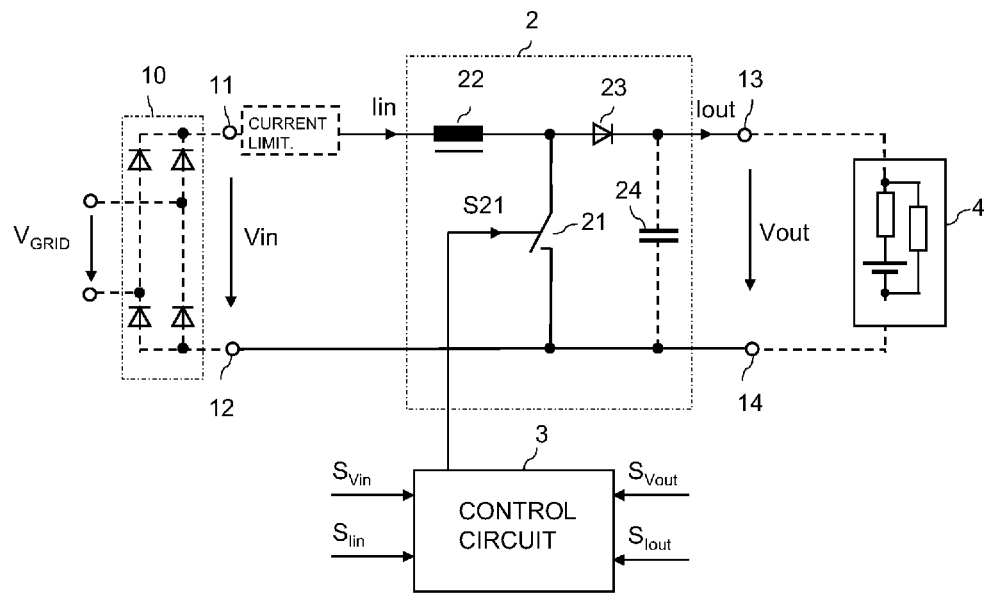
FIG. 1 schematically illustrates a first embodiment of a power converter circuit including a boost converter stage with a semiconductor switch, and including a control circuit for controlling the boost converter stage.

FIG. 1 illustrates a first embodiment of a power converter circuit, in particular of a power converter circuit for supplying power to a rechargeable battery. Unlike a conventional power converter circuit for charging a battery, the power converter circuit according to this embodiment is a single stage power converter circuit including only one converter stage having an output characteristic that is suitable to charge a battery and an input characteristic that is dependent on a specific regulation scheme explained below.

Referring to FIG. 1, the power converter circuit includes input terminals 11, 12 for receiving an input voltage Vin and an input current Iin, output terminals 13, 14 for coupling a load 4 thereto and for providing an output voltage Vout and an output current Iout to the load 4. The power converter circuit further includes a boost converter stage 2 coupled between the input terminals 11, 12 and the output terminals 13, 14. The boost converter stage 2 includes at least one semiconductor switch 21 configured to receive a drive signal S21, in particular a PWM (pulse-width modulated) drive signal.

Referring to FIG. 1, the converter stage 2 may have a conventional boost converter topology. In the embodiment of FIG. 1, the boost converter stage 2 includes a series circuit with an inductive storage element 22, such as a choke, and the semiconductor switch 21, and includes a rectifier element 23, such as a diode. The series circuit with the inductive storage element 22 and the semiconductor switch 21 is coupled between the input terminals 11, 12, and a circuit node common to the inductive storage element 22 and the semiconductor switch 21 is coupled to a first output terminal 13 through the diode 23. A series circuit with the semiconductor switch 21 and the rectifier element 23 is coupled between the output terminals 13, 14.

Optionally, a capacitive storage element 24 is coupled between the output terminals 13, 14.

Figure 2A:
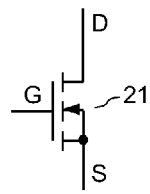
FIGS. 2A and 2B, shows different embodiments of the semiconductor switch.
Figure 2B:
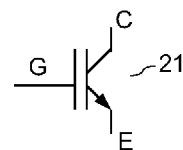

Referring to FIGS. 2A and 2B, the semiconductor switch 21 can be implemented as a conventional semiconductor switch, such as a MOSFET (Metal Oxide Semiconductor Field Effect Transistor) (see FIG. 2A), or an IGBT (Insulated Gate Bipolar Transistor) (see FIG. 2B). Referring to FIG. 1, the semiconductor switch 21 has a control circuit for receiving the drive signal S21 and a load path connected in series with the inductive storage element 22. In the MOSFET of FIG. 2A, a gate terminal G forms the control terminal, and a drain-source-path D-S forms the load path. In the IGBT of FIG. 2B, a gate terminal G forms the control terminal and a collector-emitter path C-E forms the load path.

The input voltage Vin is an alternating voltage, such as an alternating voltage obtained from a sinusoidal power grid voltage $V_{GRID}$ through a rectifier. Referring to FIG. 1, the rectifier may be a bridge rectifier 10. The power converter circuit is configured to control the input current Iin dependent on the input voltage Vin such that there is a predefined phase difference between the input voltage Vin and the input current Iin, such as zero. However, there are also operation scenarios possible in which a phase difference other than zero is desired.

Figure 3:
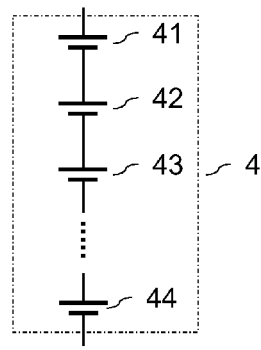
FIG. 3 illustrates one embodiment of a load implemented as a rechargeable battery with a plurality of battery cells.

The power converter circuit is further configured to generate the output voltage Vout and the output current Iout to comply with the requirements of a rechargeable battery. Referring to FIG. 3, the rechargeable battery 4 may include a plurality of battery cells connected in series. The rechargeable battery may be a Lithium-Ion battery, or any other type of rechargeable battery.

In order to comply with the requirements of the rechargeable battery and/or to comply with requirements of a power grid supplying the input voltage, the boost converter stage is operable to operate in one of three different operation modes dependent on the output voltage. In each of these operation modes, the input current is controlled dependent on the input voltage and at least one additional parameter is controlled, where the parameter that is controlled or the way the parameter is controlled is different in each of the three different operation modes.

Referring to FIG. 1, the power converter circuit further includes a control circuit 3 configured to generate the PWM drive signal S21. The control circuit 3 controls the operation of the power converter circuit and is configured to operate the power converter circuit in the three different operation modes dependent on the output voltage Vout. The output voltage Vout represents a charging state of the rechargeable battery 4, so that the power converter circuit is operated in one of three different operation modes dependent on the charging state of the rechargeable battery 4. These operation modes are explained with reference to embodiments illustrated in FIGS. 4 and 5 below. Since the control circuit 3 controls the operation of the power converter circuit, the operation modes will also be referred to as control modes in the following.

In each of these three control modes at least one of an average of the output current Iout, an average of the input current Iin, and the output voltage Vout is controlled. Further, in each of these three control modes the input current Iin is controlled dependent on the input voltage Vin such that there is a predefined phase difference between input current Iin and the input voltage Vin.

The control circuit 3 receives an input voltage signal $S_{Vin}$ representing the input voltage, an input current signal $S_{Iin}$ representing the input current Iin, and at least an output voltage signal $S_{Vout}$ representing the output voltage Vout.

When, for example, the input voltage Vin is a rectified sinusoidal grid voltage, and when the input current Iin is controlled to be in phase with the input voltage Vin, the input current Iin is an AC current (with a current waveform corresponding to the waveform of a rectified sinusoidal signal) with a frequency that is twice the frequency of the grid voltage. The frequency of the AC input current Iin is 100 Hz or 120 Hz, when the frequency of the grid voltage $V_{GRID}$ is 50 Hz or 60 Hz, respectively. Due to variations of the input current Iin at a frequency of twice the frequency of the grid voltage $V_{GRID}$, there are corresponding variations of the output current Iout. Due to variations of the input current Iin there are corresponding variations of the output current Iout. Assuming that the charging state of the rechargeable battery 4 and, therefore, the output voltage Vout can be considered to be constant for several cycles of the input current Iin, then the output current Iout has a waveform corresponding to a sine square signal. In the following, the average input current is the average of the input current Iin within one cycle of the input current Iin, and the average output current is the average of the alternating output current Iout within one cycle of the output current Iout.

Figure 4:
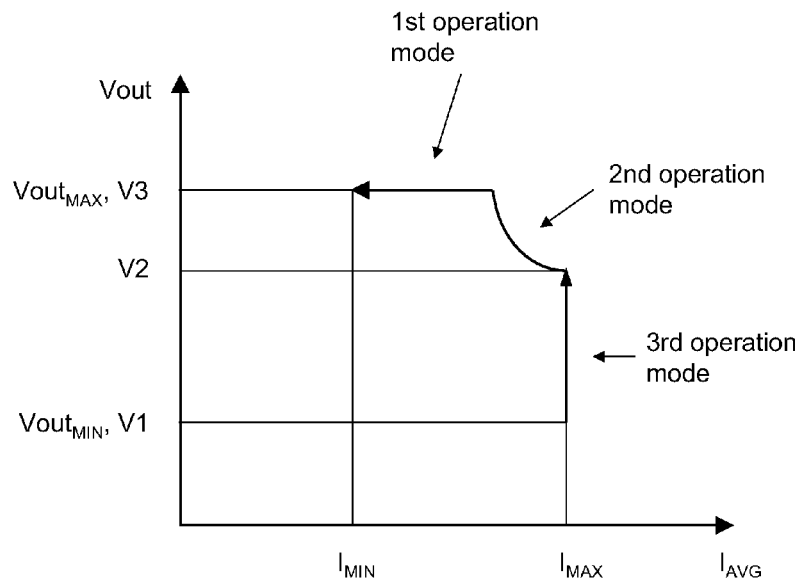
FIG. 4 illustrates the operating principle of the power converter circuit in accordance with a first embodiment.
Figure 5:
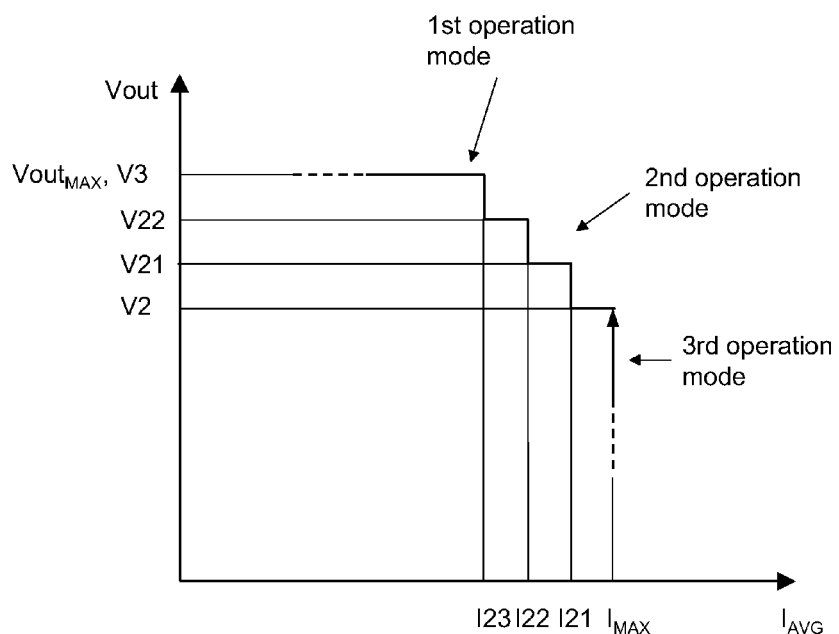
FIG. 5 illustrates the operating principle of the power converter circuit in accordance with a second embodiment.

The operating principle of the power converter circuit is explained with reference to FIGS. 4 and 5 below. FIGS. 4 and 5 illustrate the desired value (set-value) of an average current $I_{AVG}$ of the power converter circuit dependent on the output voltage Vout or the charging state of the rechargeable battery 4, respectively. The average current $I_{AVG}$ is either the average input current or the average output current of the power converter circuit.

Referring to FIG. 4, the power converter circuit is configured to assume one of three different operation modes dependent on the output voltage Vout. The operation mode of the power converter circuit is governed by the control circuit 3 which controls the power converter circuit in different ways in the individual operation modes. The operation modes will also be referred to as control modes in the following. The power converter circuit is in a first control mode, when the output voltage Vout is in a first voltage range between a first voltage V1 and a second voltage V2. According to one embodiment, the first voltage V1 is a minimum output voltage $Vout_{MIN}$ of the power converter circuit. This minimum output voltage higher than the maximum possible peak voltage of the input voltage Vin. In the first control mode, the control circuit 3 generates the drive signal S21 such that the average current $I_{AVG}$ is in accordance with a first current characteristic. The "current characteristic" of the average current $I_{AVG}$ describes the dependency of the average current $I_{AVG}$ on the output voltage $V_{OUT}$. According to one embodiment, the average current $I_{AVG}$ is controlled such that it is substantially constant in the first voltage range [V1, V2]. The desired average output current $I_{AVG}$ in the first voltage range is referred to as $I_{MAX}$ in FIG. 4.

In FIG. 4, the desired value (set-value) of the average current $I_{AVG}$ dependent on the output voltage Vout is illustrated. It goes without saying that instantaneous values of the average output current $I_{AVG}$ may vary in the operation of the power converter circuit.

According to a further embodiment, a maximum of the input current Iin is controlled to be constant in the first voltage range [V1, V2].

The average current $I_{AVG}$ is controlled to have a second current characteristic when the output voltage Vout is in a second voltage range that includes voltages between the second voltage V2 and a third voltage V3. In the second voltage range, the average current $I_{AVG}$ is controlled such that the average current $I_{AVG}$ decreased when the output voltage Vout increases. Referring to FIG. 4, the average current $I_{AVG}$ may be continuously decrease, when the output voltage Vout increases. According to one embodiment, the average current $I_{AVG}$ is controlled such that either the input power or the output power of the voltage converter circuit is constant. The average input power is given by the product of the average input voltage Vin and the average input current Iin, and the average output power is given by the product of the average output current and the output voltage Vout.

When the output voltage Vout is above the second voltage range, the power converter circuit enters a third control mode in which the output voltage Vout is controlled. According to one embodiment, the output voltage Vout is controlled to be substantially constant. Referring to FIG. 1, a rechargeable battery 4 can be represented by a parallel circuit including a series circuit with a capacitor and a first resistor and a second resistor connected in parallel with the series circuit. Usually the second resistor is much greater than the first resistor and forms a discharging path for the capacitor. When the output voltage Vout is controlled to be constant, an output current Iout is still provided to the battery 4 that charges the battery. In order to keep the output voltage Vout constant, the output current Iout decreases in order to reduce the voltage drop across the first resistor connected in series with the capacitor. According to one embodiment, the control circuit 3 monitors the output current Iout or the input current Iin and stops the operation of the power converter circuit when an average value of the monitored current has fallen below a predefined current threshold. Stopping the operation may including permanently switching off the semiconductor switch 21.

Rechargeable batteries, such as Lithium-Ion batteries should not be discharged such that a voltage across the battery drops below a minimum voltage. According to one embodiment, the first voltage V1 or minimum output voltage $Vout_{MIN}$ is defined by the minimum voltage of the battery. When, for example, the battery includes N battery cells, the minimum voltage $Vout_{MIN}$ is given by the product $N \cdot V_{MIN}$ of the number of battery cells and the minimum voltage $V_{MIN}$ of each battery cell. Equivalently, each rechargeable battery has a maximum voltage, where the battery should not be charged such that the voltage increases above the maximum voltage. According to one embodiment, the third voltage V3 corresponds to a maximum voltage $Vout_{MAX}$ of the rechargeable battery. When the rechargeable battery includes a plurality of N battery cells connected in series, the maximum voltage $Vout_{MAX}$ is defined by the product $N \cdot V_{MAX}$, where $V_{MAX}$ is the maximum voltage of the individual battery cells.

FIG. 5 illustrates the operating principle of a power converter circuit according to a further embodiment. In the embodiment of FIG. 5, the average current $I_{AVG}$ does not decrease continuously when the output voltage Vout increases in the second voltage range [V2, V3], but decreases stepwise. The second voltage range is subdivided in three sub-ranges, where different set-values of the average current $I_{AVG}$ are given for the individual sub-ranges. In a first sub-range between the second voltage V2 and a first intermediate voltage V21 the set-value of the average current $I_{AVG}$ is I21, which is lower than the current in the first voltage range [V1, V2]. In a second sub-range between the first intermediate voltage V21 and a second intermediate voltage V22 the set-value of the average current $I_{AVG}$ is I21, which is lower than I21, i.e. I22<I21. In a third sub-range between the second intermediate voltage V22 and the third voltage V3 the set-value of the average current $I_{AVG}$ is I23, with I23<I22<I21. Subdividing the second voltage range into three sub-ranges, as illustrated in FIG. 5, is only an example. It is also possible, to subdivide the second voltage range in only two sub-ranges or into more than three sub-ranges. The size of the individual sub-ranges (which equals the difference between the upper voltage and the lower voltage of each sub-range) may be equal. However, it is also possible to select different sizes for the individual sub-ranges. Further, the difference between the set-value assigned to one sub-range and the set-value assigned to an adjacent sub-range, such as the difference between I22 and I21 or between I23 and I22, may be equal. However, it is also possible to select the set-values I21, I22, I23 such that differences between set-values assigned to adjacent sub-ranges are different.

Figure 6:
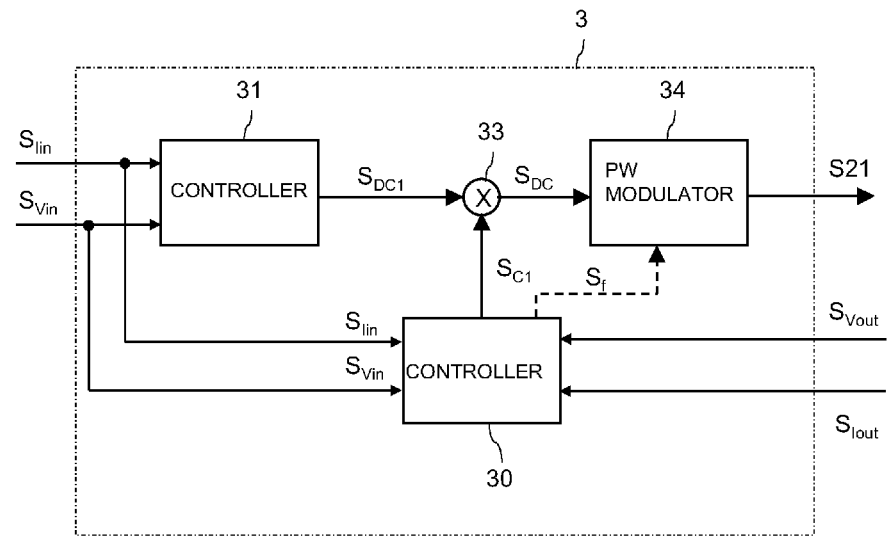
FIG. 6 illustrates a first embodiment of the control circuit.

FIG. 6 shows a block diagram illustrating the basic control scheme of the control circuit 3. The control circuit 3 includes a pulse-width modulator 34 that generate the PWM drive signal S21 with a duty cycle defined by a duty cycle signal $S_{DC}$ received at an input of the modulator 34. The control circuit 3 further includes a first controller 31 receiving the input current signal $S_{Iin}$ and the input voltage $S_{Vin}$ and that generates a first duty cycle signal $S_{DC1}$ based on these signals. The first duty cycle signal $S_{DC1}$ is generated by the first controller 31 such that the duty cycle $S_{DC1}$ varies within one period (cycle) of the AC input voltage Vin such that there is a predefined phase difference, such as zero, between the input current Iin and the input voltage Vin.

Referring to FIG. 6, the control circuit 3 includes a second controller 30 receiving the input current signal $S_{Iin}$ and the input voltage signal $S_{Vin}$ and receiving at least the output voltage signal $S_{Vout}$. The second controller 30 provides a control signal $S_{C1}$ that is multiplied with the first duty cycle signal $S_{DC1}$ of the first controller 31 through a multiplier 33. An output signal of the multiplier 33 is the duty cycle signal $S_{DC}$ received by the modulator 34.

While the first duty cycle signal $S_{DC1}$ may vary within one period of the input voltage Vin, second controller 30 is configured such that the control signal $S_{C1}$ changes slower than the first duty cycle signal $S_{DC1}$, so that the first control signal $S_{C1}$ can be considered almost constant during one period of the input voltage Vin. The control signal $S_{C1}$ provided by the second controller 30 generally increases or decreases the duty cycle signal $S_{DC}$. The first duty cycle signal $S_{DC1}$ serves to control the input current Iin such that there is a desired phase difference between the input current Iin and the input voltage Vin, while the control signal $S_{C1}$ serves to control the desired parameter of the power converter circuit in the individual control modes. Thus, the control signal $S_{C1}$ serves to control the average current $I_{AVG}$, which may be the average input current or the average output current, in the first and the second control mode, and serves to control the output voltage Vout in the third control mode. Optionally, the second controller 30 also receives the output current signal $S_{OUT}$.

The control circuit 3 of FIG. 6 includes two control loops, namely a first control loop with the first controller 31 that controls the input current Iin, and a second control loop with the second controller 30 that controls the average current $I_{AVG}$ or the output voltage Vout in the individual control modes of the power converter circuit. The first control loop, which may also be referred to as inner control loop, is normally faster than the second control loop, which may also be referred to as outer control loop.

The control circuit 3 of FIG. 6 can be implemented in many different ways. The block diagram of FIG. 6 serves to illustrate the basic operating principle of the control circuit 3. However, the individual circuit blocks of the control circuit 3 may not be separated as strictly as illustrated in FIG. 6.

Figure 7:
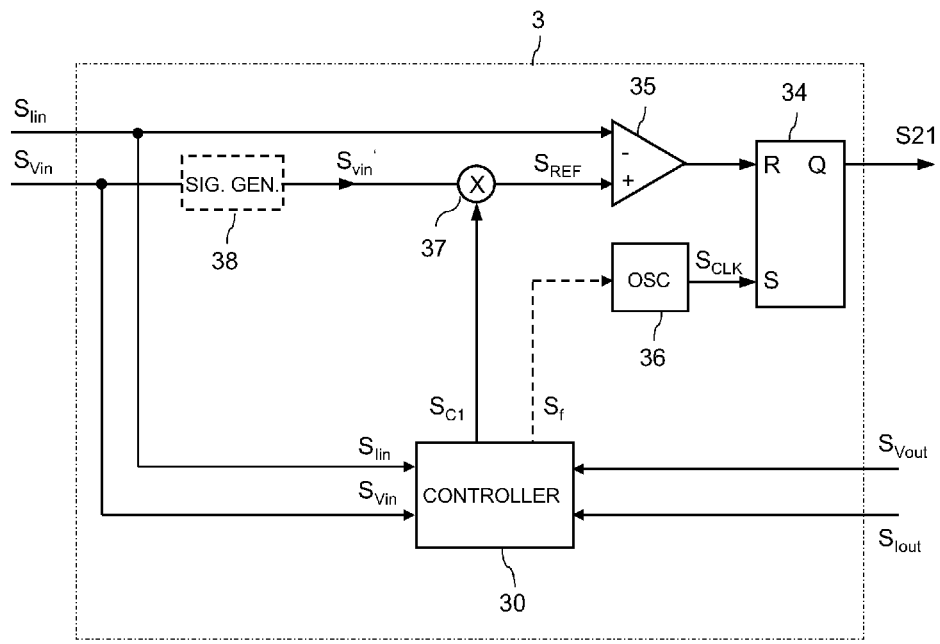
FIG. 7 illustrates a second embodiment of the control circuit.

FIG. 7 illustrates an embodiment of a control circuit 3 that has the functionality as explained with reference to the block diagram in FIG. 6. The control circuit 3 of FIG. 7 includes the second controller 30 explained with reference to FIG. 6 that provides the control signal $S_{C1}$. A multiplier 37 multiplies the control signal $S_{C1}$ with the input voltage signal $S_{Vin}'$ to provide a reference signal $S_{REF}$. A comparator 35 receives the reference signal $S_{REF}$ at a first input and the input current signal $S_{IN}$ at a second input. In the embodiment of FIG. 7, the first comparator input, is the non-inverting input, while the second comparator input is the inverting input. The control circuit 3 further includes a flip-flop (a SR flip-flop in the present embodiment). The flip-flop has a set input S receiving a clock signal $S_{CLK}$ from an oscillator 36 and a reset input R receiving an output signal of the comparator 35. The drive signal S21 is available at an output Q (the non-inverting output in the present embodiment) of the flip-flop 34.

Figure 8:
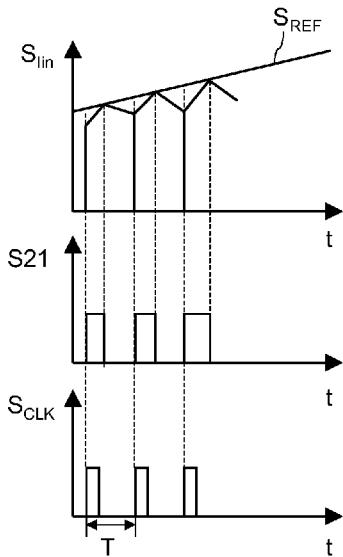
FIG. 8 illustrates the basic operating principle of the control circuit.

The operating principle of the control circuit 3 of FIG. 7 is explained with reference to FIG. 8 below. FIG. 8 schematically illustrates timing diagrams of the input current signal $S_{Iin}$, of the drive signal S21, and of the clock signal $S_{CLK}$. For explanation purposes it is assumed that the drive signal S21 assumes an on-level that switches the semiconductor switch 21 (see FIG. 1) on when the flip-flop 34 is set, and that the drive signal S21 assumes an off-level that switches the semiconductor switch 21 off when the flip-flop 34 is reset. In the present embodiment, the on-level of the drive signal S21 is a high-level, while the off-level is a low-level.

Referring to FIGS. 7 and 8, the input current Iin and, therefore, the input current signal $S_{Iin}$ starts to increase each time the flip-flop 34 is set through the clock signal $S_{CLK}$, which is when the drive signal S21 assumes an on-level and switches the semiconductor switch 21 (see FIG. 1) on. The flip-flop 34 is reset when the input current $S_{Iin}$ reaches the reference signal $S_{REF}$. Referring to FIG. 7, the reference signal $S_{REF}$ is dependent on the input voltage signal $S_{Vin}$, which may be an AC signal or a rectified AC signal, and is further dependent on the control signal $S_{C1}$. When the control signal $S_{C1}$ increases, the reference signal $S_{REF}$ increases, which results in a general increase of the duty cycle of the drive signal S21. The reference signal $S_{REF}$ decreases, when the control signal $S_{C1}$ decreases, which results in a general decrease of the duty cycle.

Alternatively, the drive signal S21 may be generated such that the electronic switch 21 in each switching period is switched on for a fixed time period, where the frequency at which the switch 21 is switched on varies. The frequency decreases when the instantaneous input power or the instantaneous output power is to be decreased, and the frequency increases when the instantaneous input power or the instantaneous output power is to be increased.

According to one embodiment, the control circuit 3 includes a signal generator 38 that receives the input voltage signal $S_{Vin}$ and provides a modified input voltage signal $S_{Vin}'$ from the input voltage signal $S_{Vin}$. According to one embodiment, the signal generator 38 simply amplifies voltage signal $S_{Vin}$. According to a further embodiment, the signal generator 38 introduces a phase shift. Through the phase shift intro-duced by the signal generator 38 a phase shift between the input current Iin and the input voltage Vin can be adjusted.

Optionally a frequency of the clock signal $S_{CLK}$ is dependent on at least one of the control signal $S_{C1}$ and the output voltage. According to one embodiment, a frequency of the clock signal $S_{CLK}$ increases as the output voltage increases. In the embodiments of FIGS. 6 and 7, the control circuit 3 optionally generates a frequency signal $S_f$ received by the modulator 34 and the oscillator 36, respectively, and configured to adjust the frequency of the clock signal $S_{CLK}$. Increasing the frequency of clock signal $S_{CLK}$ corresponds to increase the frequency of the PWM drive signal S21 and may help to reduce ripples of the input current Iin and the output current Iout. The duty cycle of the drive signal is defined by the ratio between an on-period and a cycle period of the clock signal $S_{CLK}$, where the on-period is the duration for which the switching element 21 is switched on in one cycle period.

Figure 9:
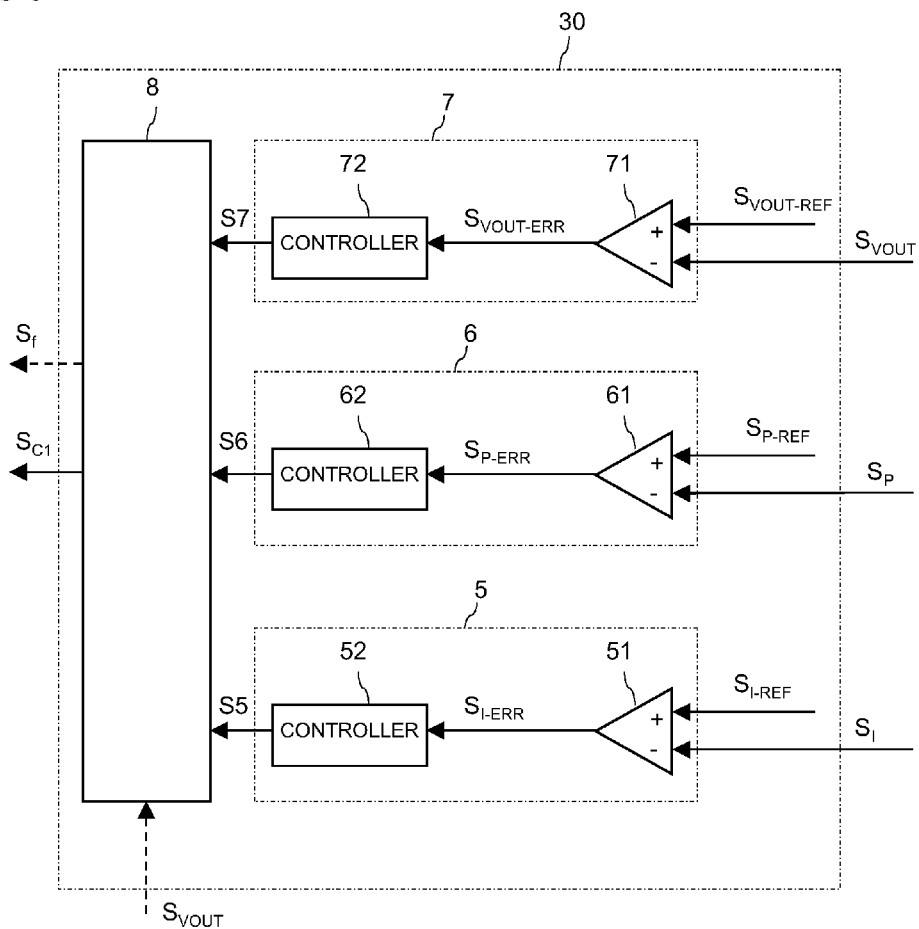
FIG. 9 illustrates an embodiment of one controller in the control circuit.

FIG. 9 illustrates an embodiment of the second controller 30. This controller includes three independent control units 5, 6 and 7, namely one control unit for each of the three control modes. Each control unit 5, 6, 7 provides one control signal S5, S6, S7 received by a selection unit 8. The selection unit 8 forwards one of the control signals S5, S6, S7 to the output, where the control signal $S_{C1}$ is available.

Each of the control units 5, 6, 7 includes an error amplifier, 51, 61, 71 providing an error signal, and a controller 52, 62, 72 receiving the error signal from the error amplifier 51, 61, 71. The controller 52, 62, 72 is, e.g., a PID controller. The individual control units 5, 6, 7 can be implemented with analog circuit means, with digital circuit means, or with analog and digital circuit means. Each of the control units 5, 6, 7 is responsible for controlling one parameter of the power converter circuit in one control mode. Thus, each control unit 5, 6, 7 receives one signal representing the instantaneous value of the parameter to be controlled, and a second signal representing the set-value of the corresponding parameter.

The first control unit 5 serves to control the average current $I_{AVG}$ in the first control mode. The error amplifier 51 of the first control unit 5 receives a measurement signal $S_I$ representing the current to be controlled, which may be the input current Iin or the output current Iout. $S_I$ in FIG. 9 is a measurement signal representing one of these currents. This current may be measured in a conventional way. This measurement signal $S_I$ may represent the instantaneous value of the input current $I_{in}$ or the output current Iout, which is an AC signal. The error amplifier further receives a set-value $S_{I-REF}$ of the average current at a second input.

When the measurement signal $S_I$ represents the instantaneous value of the input current Iin or of the output current Iout, respectively, an error signal $S_{I-ERR}$ at the output of the error amplifier 51 is an alternating signal. However, the controller 52 has an integrating characteristic with a time constant that is high enough to compensate variations of the error signal resulting from the AC nature of the measurement signal $S_I$, so that the average current is controlled. The controller 52 generates the control signal S5 from the error signal $S_{I-ERR}$.

According to a further embodiment, the measurement signal $S_I$ does not represent the instantaneous value of the input current Iin or the output current Iout, but represents an average value of the input current Iin or the output current Iout, or represents the maximum of the input current Iin or the output current Iout occurring in each period (cycle) of the input current Iin or the output current Iout.

The second control unit 6 controls the average current $I_{AVG}$ in the second control mode. In the embodiment of FIG. 9, the second control unit 6 generates the control signal S6 dependent on the input power or dependent on the output power of the power converter circuit. A measurement signal $S_P$ received at a first input of the error amplifier 61 represents the input power or the output power of the power converter circuit. $S_P$ may present the instantaneous input power or the instantaneous output power, where these powers, due to the nature of the AC input voltage Vin and the AC input current Iin, are alternating. According to a further embodiment, the measurement signal $S_P$ represents an average input power or an average output power of the power converter circuit. A set value $S_{P\text{-}REF}$ received at a second input of the error amplifier 61 represents the desired input power or the desired output power of the power converter circuit, respectively. An error signal $S_{P\text{-}ERR}$ available at the output of the error amplifier 61 is received by the controller 62 that generates the control signal S6. The error signal $S_{P\text{-}ERR}$ may be an alternating signal when the measurement signal $S_P$ is an alternating signal. However, the controller 62 has an integrating characteristic with a time constant that is high enough to compensate for variations of the error signal $S_{P\text{-}ERR}$ resulting from the AC nature of the instantaneous input power or the instantaneous output power, respectively.

The third control unit 7 serves to control the output voltage Vout. The output voltage signal $S_{VOUT}$ is an instantaneous value of the output voltage Vout. Further, the error amplifier 71 receives a set-value $S_{VOUT\text{-}REF}$. An error signal $S_{VOUT\text{-}ERR}$ available at the output of the error amplifier 71 represents a difference between the output voltage signal $S_{VOUT}$ and the set-value $S_{VOUT\text{-}REF}$. The error signal $S_{VOUT\text{-}ERR}$ is received by the controller 72 that generates the control signal S7.

According to one embodiment, the selection unit 8 receives the output voltage signal $S_{VOUT}$ and is operated such that the first control signal S5 is forwarded to the output when the output voltage Vout is in the first voltage range, that the second control signal S6 is forwarded to the output when the output voltage is in the second voltage range, and that the third control signal S7 is forwarded to the output when the output voltage Vout is above the second voltage range.

According to a further embodiment, the selection unit 8 is configured to determine that control signal of the three control signals S5, S6, S7 that instantaneously has the minimum value and forwards the control signal having the minimum value to the output.

The set values $S_{VOUT\text{-}REF}$, $S_{I\text{-}REF}$, and $S_{P\text{-}REF}$ may be constant values. According to a further embodiment, these set values are adjustable (variable) values that may be adjusted dependent on at least one of the grid voltage, the temperature of the power converter circuit, and the specific type of load connected to the output terminal.

Figure 10:
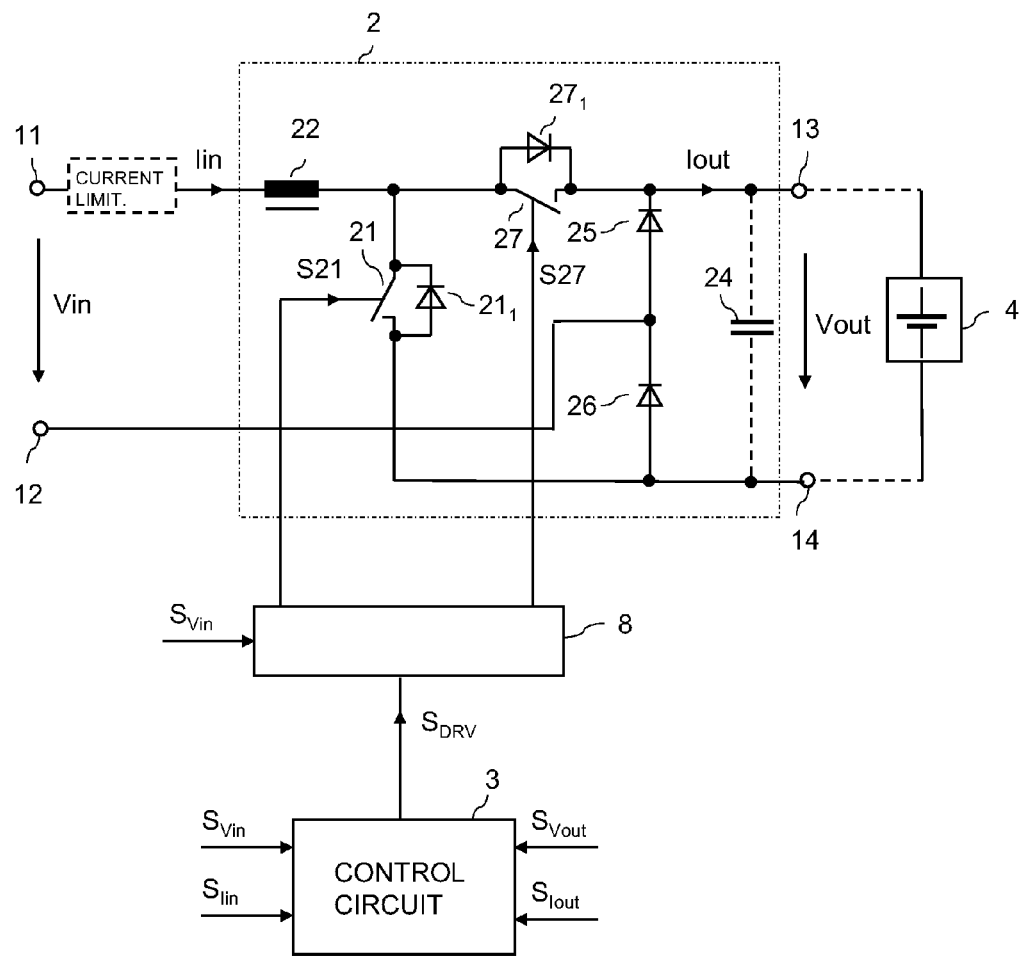
FIG. 10 illustrates a further embodiment of a power converter circuit including a boost converter stage with a semiconductor switch, and including a control circuit for controlling the boost converter stage.

FIG. 10 illustrates a further embodiment of the power converter circuit. The power converter circuit of FIG. 10 is based on the power converter circuit of FIG. 1, where the differences between these power converter circuits are explained below. In the power converter circuit of FIG. 10, the input terminals 11, 12 may directly receive a grid voltage $V_{GRID}$ as the input voltage Vin, so that a bridge rectifier 10 as illustrated in FIG. 1 is not required.

The power converter circuit includes a further semiconductor switch 27 instead of a rectifier element (diode 23 in FIG. 1).

In the following, the semiconductor switch 21 already explained with reference to FIG. 1 will be referred to as first semiconductor switch, and the further semiconductor switch 27 will be referred to as second semiconductor switch. Each of these first and second semiconductor switches 21, 27 includes a free-wheeling element $21_1$, $27_1$, such as, e.g., a diode. According to one embodiment, the first and second semiconductor switches 21, 27 are implemented as MOS-FETs. In this case, the rectifier elements $21_1$, $27_1$ can be implemented as integrated body diodes of the MOSFETs. While in the power converter circuit of FIG. 1, the second input terminal 12 is connected to the second output terminal 14, in the power converter circuit of FIG. 10, the second input terminal 12 is connected to the first output terminal 13 via a first rectifier element 25 and to the second output terminal 14 via a second rectifier element 26. The two rectifier elements 25, 26 are serially connected between the output terminals 13, 14, wherein the second input terminal 12 is coupled to a circuit node common to the two rectifier elements 25, 26.

Referring to FIG. 10, the first switching element 21 is driven by a first drive signal S21, and the second semiconductor switch 27 is driven by a second drive signal S27. The first and second drive signals S21, S27 are provided by a circuit 8 dependent on a drive signal $S_{DRV}$ provided by the control circuit 3, and dependent on the input voltage signal $S_{Vin}$. The drive signal $S_{DRV}$ provided by the control circuit 3 may correspond to the drive signal S21 explained herein before.

According to one embodiment, circuit 8 providing the two drive signal S21, S27 is a multiplexer that provides the drive signal $S_{DRV}$ to the first semiconductor switch 21 during a positive half-period of the sinusoidal input voltage Vin, and that provides the drive signal $S_{DRV}$ to the second semiconductor switch 27 during the second half-period of the input voltage Vin. In this embodiment, the second semiconductor switch 27 is switched off in the first half-period of the input voltage Vin, so that only the rectifier element $27_1$ is active, and the first semiconductor switch 21 is switched off during the second half-period of the input voltage Vin, so that only the rectifier element $21_1$ is active. During the first half-period of the input voltage Vin, the input voltage Vin is positive, while the input voltage Vin is negative during the second half-period.

The operating principle of the power converter circuit of FIG. 10 is explained below. During the first half-period of the input voltage Vin, the power converter circuit of FIG. 10 operates like the power converter circuit of FIG. 1. That is, the first semiconductor switch 21 is driven in a pulsewidth-modulated fashion such that the average of the input current Iin and the input voltage Vin have a predefined phase difference, and such that the power converter circuit operates in one of the three different operation modes, so as to control the average current, the output voltage or the input power or the output power. When the first semiconductor switch 21 is switched on, energy is inductively stored in the inductive storage element 22; the stored energy is transferred to the output terminals 13, 14 via the rectifier element $27_1$ when the first semiconductor switch 21 is switched off. During the first half-period, the current through the second rectifier element 26 corresponds to the input current Iin, while the current through the first rectifier element 25 is zero.

In the second half-period, the second semiconductor switch 27 is driven in a pulse width-modulated fashion. When the second semiconductor switch 27 is switched on, a series circuit with the first rectifier element 25, the second switching element 27 and the inductive storage element 22 is connected between the input terminals 11, 12, so that energy is inductively stored in the inductive storage element 22. The input current Iin at the first input terminal 11 flows in a direction opposite to the direction as illustrated in FIG. 10. When the second semiconductor switch 27 is switched of, the current flows through a voltage source (not illustrated) connected to the input terminals 11, 12, the first rectifier element 25, the battery 4, and the rectifier element $21_1$ of the first semiconductor switch 21. The signal waveform of the output current Iout corresponds to the signal waveform of the output current Iout of the power converter circuit of FIG. 1.

According to a further embodiment, the circuit 8 does not simply switch off the second semiconductor switch 27 in the first half-period of the input voltage Vin and the second semiconductor switch 21 in the second half-period of the input voltage Vin. In this embodiment, the second semiconductor switch 27 operates as an active rectifier element in the first half-period, and the first semiconductor switch 21 operates as an active rectifier element in the second half-period of the input voltage Vin. Thus, the second semiconductor switch 21, during the first half-period, is switched on, each time the first semiconductor switch 21 is switched off and is switched off, when the first semiconductor switch 21 is again switched on. Equivalently, in the second half-period, the first semiconductor switch 21 is switched on, when the second semiconductor switch 27 is switched off, and the first semiconductor switch 21 is again switched off, when the second semiconductor switch 27 is switched on. In this embodiment, the circuit 8 provides the drive circuit $S_{DRV}$ to the first semiconductor switch 21 during the first half-period of the input voltage Vin and drives the second semiconductor switch 21 complementary to the first semiconductor switch, wherein a dead-time may be provided between switching off the first semiconductor switch 21 and switching on the second semiconductor switch 27. During dead-time the current flows through the rectifier element $27_1$. Equivalently, the circuit 8 provides the drive signal $S_{DRV}$ to the second semiconductor switch 27 during the second half-period and drives the first semiconductor switch 21 complementary to the second semiconductor switch 27.

According to one embodiment, the power converter circuit and, more specifically, the control circuit 3 is configured to change from one operation mode to another operation mode only at those times at which an instantaneous value of the input voltage Vin and, therefore, an instantaneous value of the input current Iin is zero.

The figures illustrate a power converter circuit in a single phase system. In a three-phase system, three of the power converter systems explained before can be employed to charge a battery, wherein one control circuit providing three drive signals may be employed for the three power converter circuit.

In the above detailed description, directional terminology, such as "top," "bottom," "front," "back," "leading," "trailing," "under," "below," "lower," "over," "upper," etc., is used with reference to the orientation of the figures being described. Because components of embodiments can be positioned in a number of different orientations, the directional terminology is used for purposes of illustration and is in no way limiting. It is to be understood that the features of the various exemplary embodiments described herein may be combined with each other, unless specifically noted otherwise.

Further, terms such as "first," "second," and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Other embodiments may be utilized and structural or logical changes may be made without departing from the scope of the present invention. The detailed description, therefore, is not to be taken in a limiting sense. Instead, the present invention is defined and limited only by the appended claims and their legal equivalents.

What is claimed is:

1. A power converter circuit, comprising:
   input terminals configured to receive an input voltage and an input current and output terminals configured to provide an output voltage and an output current; and
   a boost converter stage coupled between the input terminals and the output terminals;
   wherein the power converter circuit is operable to operate in one of a first operation mode, a second operation mode, and a third operation mode dependent on the output voltage,
   wherein the first, second and third operation modes are mutually different, and
   wherein, in each of the first, second and third operation modes, the input current is controlled dependent on the input voltage.

2. The power converter circuit of claim 1, wherein the boost converter stage comprises a semiconductor switch operable to receive a drive signal.

3. The power converter circuit of claim 2, further comprising a control circuit configured to control the operation mode and to generate the drive signal.

4. The power converter circuit of claim 3, wherein the control circuit comprises:
   a first control loop operable to control at least one of a duty cycle and a frequency of the drive signal to be dependent on the input current and the input voltage; and
   a second control loop operable to control at least one of the duty cycle and the frequency of the drive signal in accordance with one of the first, second and third operation modes.

5. The power converter circuit of claim 3,
   wherein the control circuit is operable to generate a first control signal dependent on one of the input current and the output current and on a current reference signal, a second control signal dependent on one of an input power and an output power and on a power reference signal, and a third control signal dependent on the output voltage and an output voltage reference signal, and
   wherein the control circuit is further operable to generate the drive signal dependent on a minimum of the first control signal, the second control signal, and the third control signal.

6. The power converter circuit of claim 3, wherein the control circuit is operable to vary at least one of a duty cycle and a frequency of the drive signal.

7. The power converter circuit of claim 1,
   wherein in the first operation mode, the power converter circuit is operable to control at least one of an average of the input current and an average of the output current,
   wherein in the second operation mode, the power converter circuit is operable to control at least one of the average of the input current dependent on an average of the input voltage and the average of the output current dependent on an average of the output voltage, and
   wherein in the third operation mode, the power converter circuit is operable to control the output voltage.

8. The power converter circuit of claim 1, wherein the power converter circuit
   operates in the first operation mode when the output voltage is in a first voltage range, operates in the second operation mode when the output voltage is in a second voltage range, wherein the second voltage range is greater than the first voltage range, and operates in the third operation mode when the output voltage is above the second voltage range.

9. The power converter circuit of claim 1, wherein the power converter circuit is operable to control the input current dependent on the input voltage such that the input current and the input voltage have a predefined phase difference.

10. The power converter circuit of claim 9, wherein the phase difference is zero.

11. The power converter circuit of claim 1, wherein the power converter circuit, in the first operation mode, is operable to control an average of the input current or an average of the output current to be substantially constant.

12. The power converter circuit of claim 1, wherein the power converter circuit, in the second operation mode, is operable to control an average of the output current such that the average of the output current decreases when then output voltage increases.

13. The power converter circuit of claim 12, wherein the power converter circuit, in the second operation mode, is operable to control an average of an input power or an average of an output power of the power converter circuit to be substantially constant.

14. The power converter circuit of claim 1, wherein the power converter circuit, in the third operation mode, is operable to control an average of the output voltage to be substantially constant.

15. The power converter circuit of claim 1, wherein the power converter is further operable to detect zero crossings of the input voltage and to change from one of the first, second and third operation modes to another one of the first, second and third operation mode only at times of zero crossings.

16. The power converter circuit of claim 1, wherein the input voltage comprises an alternating voltage.

17. The power converter circuit of claim 16, wherein the power converter circuit is operable to change from one of the first, second and third operation modes to another one of the first, second and third operation mode only at times at which an instantaneous value of the input voltage is zero.

18. The method of claim 16, further comprising changing from one of the first, second and third operation modes to another one of the first, second and third operation mode only at times at which an instantaneous value of the input voltage is zero.

19. A method for operating a power converter circuit comprising a boost converter stage coupled between input terminals and output terminals of the power converter circuit, the method comprising:
receiving an input voltage and an input current at the input terminals of the power converter circuit;
operating the power converter circuit in one of a first operation mode, a second operation mode, and a third operation mode dependent on an output voltage; and
providing the output voltage and an output current at the output terminals of the power converter circuit;
wherein the first, second and third operation modes are mutually different; and
wherein in each of the first, second and third operation modes the input current is controlled dependent on the input voltage.

20. The method of claim 19, wherein the power converter circuit comprises a semiconductor switch operable to receive a drive signal in the boost converter stage, the method further comprising:
generating the drive signal dependent on one of the first, second and third operation modes.

21. The method of claim 20, wherein generating the drive signal comprises:
controlling at least one of a duty cycle and a frequency of the drive signal dependent on the input current and the input voltage using a first control loop; and
controlling at least one of a duty cycle and a frequency of the drive signal in accordance with one of the first, second and third operation modes using a second control loop that is slower than the first control loop.

22. The method of claim 20, further comprising:
generating a first control signal dependent on one of the input current and the output current and on a current reference signal;
generating a second control signal dependent on one of an input power and an output power and on a power reference signal;
generating a third control signal dependent on the output voltage and an output voltage reference signal; and
generating the drive signal dependent on a minimum of the first control signal, the second control signal, and the third control signal.

23. The method of claim 19, further comprising:
in the first operation mode, controlling at least one of an average of the input current, and an average of the output current,
in the second operation mode, controlling at least one of the average of the input current dependent on an average of the input voltage, and the average of the output current dependent on an average of the output voltage, and
in the third operation mode, controlling the output voltage.

24. The method of claim 19, further comprising:
operating the power converter circuit in the first operation mode when the output voltage is in a first voltage range,
operating the power converter circuit in the second operation mode when the output voltage is in a second voltage range, wherein the second voltage range is greater than the first voltage range, and
operating the power converter circuit in the third operation mode when the output voltage is above the second voltage range.

25. The method of claim 19, further comprising controlling the input current dependent on the input voltage such that the input current and the input voltage have a predefined phase difference.

26. The method of claim 25, wherein the phase difference is zero.

27. The method of claim 19, further comprising controlling an average of the input current or an average of the output current to be substantially constant.

28. The method of claim 19, further comprising:
in the second operation mode, controlling an average of the output cur rent current such that the average of the output current decreases when then output voltage increases.

29. The method of claim 28, further comprising:
in the second operation mode, controlling an average of an input power or an average of an output power of the power converter circuit to be substantially constant.

30. The method of claim 19, further comprising:
in the third operation mode, controlling an average of the output voltage to be substantially constant.

31. The method of claim 19, further comprising:
detecting zero crossings of the input voltage; and
changing from one of the first, second and third operation modes to another one of the first, second and third operation mode only at times of zero crossings.

32. The method of claim 19, wherein the input voltage comprises an alternating voltage.

33. An electronic circuit, comprising:
a power converter circuit comprising input terminals for receiving an input voltage and an input current, output terminals for providing an output voltage and an output current, and a boost converter stage coupled between the input terminals and the output terminals;
a rechargeable battery coupled to the output terminals of the power converter circuit,
wherein the power converter circuit is operable to operate in one of a first operation mode, a second operation mode, and a third operation mode dependent on the output voltage,
wherein the first, second and third operation modes are mutually different, and
wherein in each of the first, second and third operation modes the input current is controlled dependent on the input voltage.

34. The electronic circuit of claim 33, wherein the input voltage comprises an alternating voltage.

35. The electronic circuit of claim 34, wherein the power converter circuit is operable to change from one of the first, second and third operation modes to another one of the first, second and third operation mode only at times at which an instantaneous value of the input voltage is zero.

* * * * *